(12) United States Patent
Taite et al.

(10) Patent No.: US 10,719,710 B2
(45) Date of Patent: Jul. 21, 2020

(54) CAPTURING MEDIA MOMENTS OF PEOPLE USING AN AERIAL CAMERA SYSTEM

(71) Applicant: Intel Corporation, Santa Clara, CA (US)

(72) Inventors: Shahar Taite, Kfar Saba (IL); Tomer Rider, Naahryia (IL); Michel Assayag, Shoham (IL)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 14/749,237

(22) Filed: Jun. 24, 2015

(65) Prior Publication Data

US 2016/0379056 A1    Dec. 29, 2016

(51) Int. Cl.
*G06K 9/00* (2006.01)
*H04N 7/18* (2006.01)

(52) U.S. Cl.
CPC ....... *G06K 9/00664* (2013.01); *G06K 9/0063* (2013.01); *G06K 9/00221* (2013.01); *G06K 9/00288* (2013.01); *G06K 9/00302* (2013.01); *G06K 9/00335* (2013.01); *G06K 9/00362* (2013.01); *G06K 9/00369* (2013.01); *G06K 9/00724* (2013.01); *G06K 9/00778* (2013.01); *H04N 7/185* (2013.01); *H04N 7/188* (2013.01); *B64C 2201/127* (2013.01); *G06K 2009/00738* (2013.01)

(58) Field of Classification Search
CPC .............................................. B64C 2201/127
See application file for complete search history.

(56) References Cited

U.S. PATENT DOCUMENTS

| 5,745,166 A * | 4/1998 | Rhodes .............. G08B 13/1409 348/143 |
|---|---|---|
| 2005/0212913 A1 | 9/2005 | Richter |
| 2010/0004802 A1 | 1/2010 | Bodin |
| 2010/0036875 A1 | 2/2010 | Miezianko et al. |
| 2012/0230540 A1 | 9/2012 | Calman et al. |

(Continued)

FOREIGN PATENT DOCUMENTS

| CN | 107660287 | 2/2018 |
|---|---|---|
| WO | 2014100519 | 6/2014 |
| WO | 2016209473 | 12/2016 |

OTHER PUBLICATIONS

"International Application Serial No. PCT US2016 033938, International Search Report dated Sep. 12, 2016", 3 pgs.

(Continued)

*Primary Examiner* — David N Werner
(74) *Attorney, Agent, or Firm* — Schwegman Lundberg & Woessner, P.A.

(57) ABSTRACT

Various systems and methods for capturing media moments are described herein. An autonomous camera system for capturing media moments includes a configuration module to receive configuration parameters; a flight control module to autonomously maneuver the autonomous camera system over a crowd of people; a search module to search for a subject in the crowd of people based on the configuration parameters; and a control module to perform an action when the subject is found in the crowd of people.

25 Claims, 4 Drawing Sheets

(56) References Cited

U.S. PATENT DOCUMENTS

| | | | | |
|---|---|---|---|---|
| 2012/0307042 A1* | 12/2012 | Lee | ............ | G08G 5/0069 |
| | | | | 348/114 |
| 2014/0142729 A1* | 5/2014 | Lobb | ............ | G06F 3/011 |
| | | | | 700/90 |
| 2015/0062334 A1* | 3/2015 | Dickinson | ............ | H04N 7/181 |
| | | | | 348/143 |
| 2015/0077421 A1* | 3/2015 | Lehtiniemi | ............ | H04N 1/387 |
| | | | | 345/473 |
| 2015/0312354 A1* | 10/2015 | Boyle | ............ | H04N 21/21805 |
| | | | | 709/219 |
| 2015/0332523 A1* | 11/2015 | Ranasinghe | ............ | G07C 5/02 |
| | | | | 701/34.2 |
| 2016/0180719 A1* | 6/2016 | Wouhaybi | ............ | G06K 9/0063 |
| | | | | 701/4 |
| 2016/0182971 A1* | 6/2016 | Ortiz | ............ | H04N 21/8133 |
| | | | | 725/34 |
| 2016/0266579 A1* | 9/2016 | Chen | ............ | H04L 67/12 |
| 2017/0201779 A1* | 7/2017 | Publicover | ............ | G06Q 30/0251 |
| 2018/0033312 A1* | 2/2018 | DeLuca | ............ | G08G 5/0008 |
| 2018/0095459 A1* | 4/2018 | Bachrach | ............ | B64C 39/024 |
| 2018/0095714 A1* | 4/2018 | Taylor | ............ | G06F 3/165 |
| 2018/0234612 A1* | 8/2018 | Kunkel | ............ | H04N 5/23206 |

OTHER PUBLICATIONS

"International Application Serial No. PCT US2016 033938, Written Opinion dated Sep. 12, 2016", 6 pgs.

"International Application Serial No. PCT US2016 033938, International Preliminary Report on Patentability dated Jan. 4, 2018", 8 pgs.

"European Application Serial No. 16814935.9, Extended European Search Report dated Feb. 12, 2019", 10 pgs.

Fang, Ruogu, "Kinship Classification by Modeling Facial Feature Heredity", Dept. of Elec. and Computer Eng., Cornell University Eastman Kodak Company, 5 pgs.

Kongwah, Wan, "Efficient Multimodal Features for Automatic Soccer Highlight Generation", Pattern Recognition, vol. 3, (Aug. 23, 2004), 4 pgs.

"European Application Serial No. 16814935.9, Response filed Sep. 11, 2019 to Extended European Search Report dated Feb. 12, 2019", 26 pgs.

* cited by examiner

CAPTURING MEDIA MOMENTS OF PEOPLE USING AN AERIAL CAMERA SYSTEM

TECHNICAL FIELD

Embodiments described herein generally relate to autonomous vehicle control and in particular, to a system for capturing media moments.

BACKGROUND

In film and video, a cutaway shot is an interruption of a continuously captured shot. Cutaway shots may be inserted in post-production or during a live broadcast. Cutaway shots may be used to maintain the audience's attention, add flavor or context to the continuous shot, or capture an interesting event occurring away from the main action. Examples of cutaway shots include scenes of a players' bench during a timeout, scenes of couples on a "kiss cam," scenes of people laughing in response to a speaker's remarks, or scenes of fans after a game is decided.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a system for capturing media moments. The present disclosure discusses an improvement to the operation of camera systems. Instead of manually operated cameras that are used in many venues today, an automated camera system is presented here. The automated camera system may be used to capture cutaway shots for live or recorded events.

In the past, cutaway shots were captured by stationery camera operators who pan and zoom through a crowd or by mobile camera operators who walk aisles or rows to capture the action. A large event may include multiple cameras, each with its own set of responsibilities. For example, at a basketball game there may be four or more cameras. Two cameras positioned near center court and two cameras on either end of the court. The number of cameras used is arbitrary, but is usually a function of the level of play. For example, a high-school game may only use a single center court camera to cover the action. In this instance, the sole camera may be used for cutaway shots by moving away from the players and zooming in on a coach, cheerleaders, an audience member, or the scoreboard. However, at higher levels of play, such as college, semi-pro, and professional the number of cameras may increase to four, ten, or even more. It is the video producer's job to compose the final cut from the video feeds available. The video producer may have multiple screens, each with a video feed, and a master screen with the output video content, which may be the content being broadcasted in a live production. The video producer makes decisions on which camera to use to depict the game play, cutaway shots, advertising, promos, etc.

The present document describes a system that uses autonomous drones to capture cutaway shots or inform the video producer or cameramen of cutaway shot opportunities. One or more semi or fully autonomous drones may fly around the public space and detect potential moments using a variety of technologies, such as emotion recognition, object recognition, natural language processing (NLP), and onboard biometric sensors.

Figure 1:
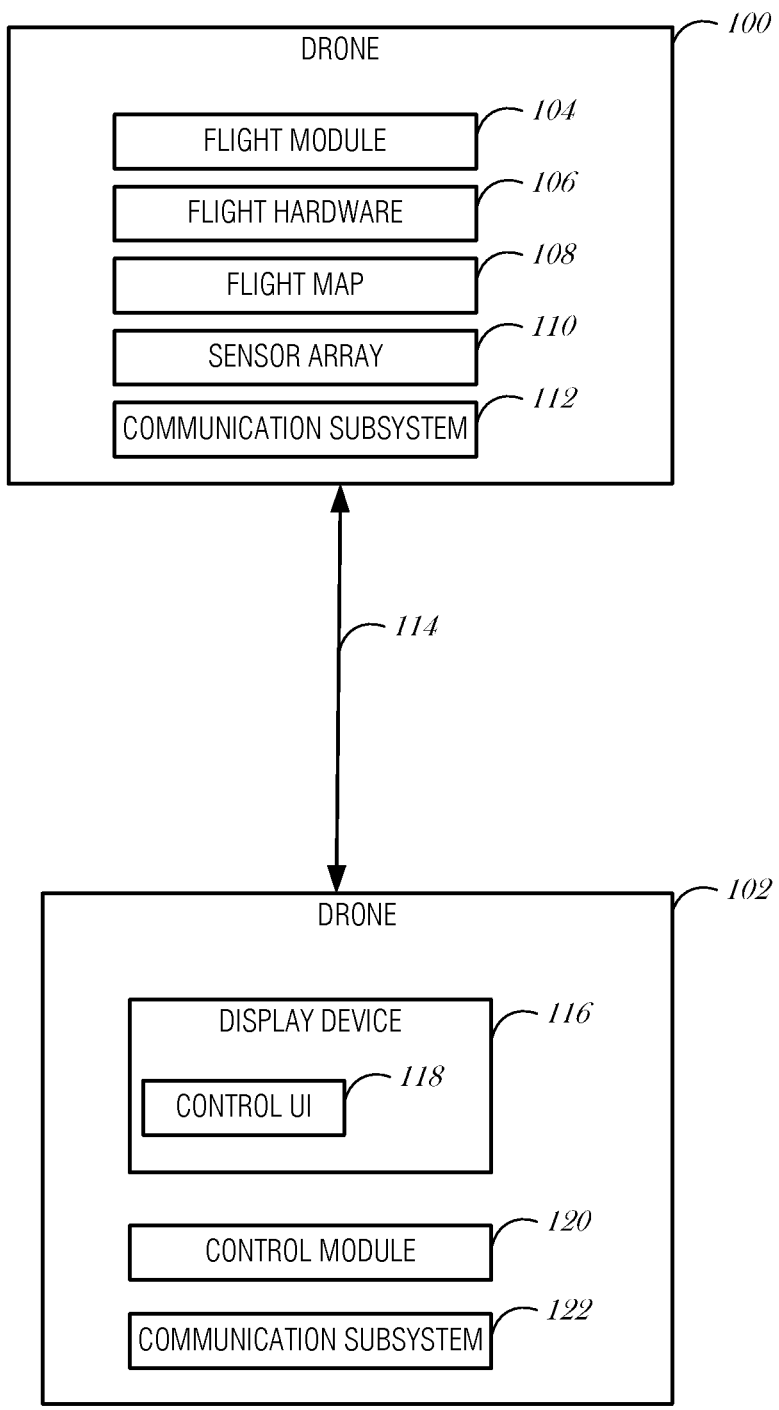
FIG. 1 is a diagram illustrating components of a drone and a remote control system, according to an embodiment.

FIG. 1 is a diagram illustrating components of a drone 100 and a remote control system 102, according to an embodiment. The drone 100 may also be referred to as a semi-autonomous vehicle or robot, which may be land-based, maritime vehicles, unmanned aerial vehicle (UAVs), suspended cameras (e.g., Skycam®), or the like. For discussion purposes, the drone 100 discussed herein is an unmanned aerial vehicle (UAV). The remote control system 102 may present one or more user interfaces (UI) to one or more users and be used to control the drone 100. For example, a UI may display a map of an area and allow a user to select waypoints that the drone 100 may follow. Communication between the remote control system 102 and the drone 100 is bi-directional. As such, images and other information captured by the drone 100 may be transmitted back to the remote control system 102 for display to the user, who may then respond with additional commands or other parameter changes.

The drone 100 includes a flight module 104, flight hardware 106, a flight map 108, a sensor array 110, and a communication subsystem 112. The drone 100 may operate semi-autonomously based on commands received from the remote control system 102. For example, when the drone 100 receives a navigation command that includes a destination—such as GPS coordinates and desired altitude—the drone 100 may move to the destination without further user input.

The flight hardware 106 includes the components of the drone 100 that propel or otherwise move the drone 100. For example, the flight hardware 106 for a quadrotor helicopter UAV (also known as a quadcopter), may include four propellers. The flight hardware 106 may vary depending on the type of drone 100 (e.g., wheels for a ground-based unit). The flight hardware 106 may also include a GPS receiver. The flight hardware 106 may also include at least one processing unit (e.g., a central processing unit, a graphical processor, or an application-specific integrated circuit). The processing unit may execute software stored on the drone 100 to perform the functions described herein of the drone 100.

The flight map 108 includes data representing a geographic area, which may include roads, arena seating, audience stands, stages, fields, playing surfaces, or the like, and GPS coordinates of various features of these geographic areas. The flight map 108 includes altitude data of the geographic area. The data may also include location data of man-made objects such as bridges, cell towers, etc. Furthermore, the flight map 108 may include a database of point-of-interest (POI) locations including, but not limited to restaurants, businesses, gas stations, stadiums, golf courses, etc. It is understood that the flight map 108 may include additional geographic, structural, or logistical details to allow the drone 100 to operate in a semi-autonomous or fully-autonomous nature. When several drones 100 are used to cover an event, the flight map 108 may include zones where each drone 100 is assigned coverage to reduce the possibility of collisions.

The sensor array 110 includes one or more sensors. Data captured by the sensor array 110 may be used internally by the drone 100 during navigation or externally by operators of the drone 100. Sensors may include, but are not limited to, temperature sensors, pressure sensors, electro-optical sensors, infrared sensors, depth cameras, camera arrays, microphone arrays, gyroscopes, accelerometers, proximity sensors, microphones, and magnetometers.

In various examples, autonomous movement of the drone 100 is accomplished using flight module 104 and one or more of the sensor array 110, the flight hardware 106, and the flight map 108. In an example, the flight module 104 includes collision detection logic. To this end, readings from a proximity sensor in the sensor array 110 may be used to determining how close the drone 100 is to an object (e.g., a wall or another drone). In an example, data stored in the flight map 108 is used to avoid objects. For example, the drone 100 may navigate around known locations of tall structures (e.g., cell towers, buildings) or fly to a sufficient height before proceeding to a location. For ground-based drones 100, the drone 100 may avoid known areas with water, holes, or the like.

The flight module 104 may also utilize image data obtained using an electro-optical or infrared sensor to avoid collisions with objects. For example, the flight module 104 may analyze image data using pattern matching algorithms to classify an object in the path of the drone 100 while moving.

The communication subsystem 112 includes one or more receivers, transmitters, or transceivers to communicate with the remote control system 102 over one or more networks. In an example, a control instruction is received by the communication subsystem 112 over the network connection (e.g., network 114). The control instruction may indicate what the next course of action is for the drone 100. For example, the control instruction may be a navigation instruction, a general directive, or other configuration setting. The communication subsystem 112 may relay the control instruction to the flight module 104 at which point the flight module 104 implements the instruction.

A network 114 communicatively connects the drone 100 with the remote control system 102. The network 114 may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 114 may include a single local area network (LAN), a wide-area network (WAN), or combinations of LAN's or WAN's, such as the Internet. The network 114 may provide a secure, encrypted, or proprietary connection between the remote control system 102 and the drone 100.

The remote control system 102 may be a standalone device or part of another device. The remote control system 102 may be a smartphone executing a remote control application, a tablet, a wearable device (e.g., smartglasses), a transmitter with a dual-stick layout and a display, a laptop, etc. In an example, the remote control system 102 may be a web-based application. In an example, the remote control system 102 is a tablet computer. The remote control system 102 may also include at least one processing unit (e.g., a central processing unit, a graphical processor, an application-specific integrated circuit) that includes one or more cores. The at least one processing unit may execute software stored on the remote control system 102 to perform the functions described herein.

The remote control system 102 includes a display device 116, a control user interface 118, a control module 120, and a communication subsystem 122. The display device 116 is a display on the remote control system 102 that presents the control user interface 118. The control user interface 118 may include various input controls to allow a user to configure the drone's operation. Various parameters or settings may be configured by the user via the control user interface 118 including, but not limited to, search parameters, footage properties, and other settings.

Search parameters are used by the drone 100 to filter people in a crowd and find certain individuals or groups. Search parameters may include emotion types, dictionary terms to search for, requested social circles or relations of people in a group, or other characteristics of people or groups of people. Emotion types may include various broad categories of emotions such as happy or sad, or more granular classifications such as bored, tired, distracted, or the like. Dictionary terms may be used to identify words or phrases that the drone 100 should search for using, for example, a long-range microphone and natural language processing. Social circles or relations may be relationships such as father-son, mother-daughter, family, team affiliation, or the like. Other characteristics may be gender, age, ethnicity, manner of dress, or the like.

Footage properties may include the number of people in a shot, the gender of people in the shot, the perspective of the shot (e.g., from the front of the person, from below or above the person, etc.), or other aspects of the video or image being captured. The drone 100 may use various face detection, object recognition, or complimentary data retrieved from social networks to identify and compose the shot.

Other settings that may be set by the user include general settings such as the geographic boundaries that the drone 100 should patrol or search within; schedules of when to patrol and for how long; number of images or videos to capture; image or video quality (e.g., standard definition or high definition); whether to store the image/video data locally, stream it, or broadcast it; whether to capture images/video or report possible subjects back to the user; and other settings.

User input may include touch input on the control user interface 118, voice input, hand gestures above the remote control system 102, or physical movement of the remote control system 102. Detection of the input may be accomplished using one or more sensors of the remote control system 102 (not illustrated) such as accelerometers, microphones, gyroscopes, or cameras. When user input is detected, the control module 120 may retrieve a control instruction for the drone 100 and then transmit the control instruction using the communication subsystem 122 over network connection 114 to the drone 100.

During operation, the drone 100 may be configured to fly around certain seating sections of a football stadium during a game. The drone 100 may be configured to locate father-son groups. Although the drone 100 in this example is configured to locate one type of group, it is understood that the drone 100 may be configured to locate more than one type of group or individual. The drone 100 may set out on a random or pre-configured path in the designated seating sections using various sensors to locate the father-son groups. For example, the drone 100 may use one or more cameras to view the audience and look for those people who have some family resemblance, are seated near each other, interact with one another, have an appropriate age difference, are dressed similarly, or other characteristics that indicate a possible relationship. Additionally or alternatively, the drone 100 may use a long-range directional microphone to capture conversion that may imply a father-son relationship (e.g., the use of "Dad" in the conversation when addressing a person). When a group of people is found, the drone 100 may perform one or more actions based on its current configuration. The drone 100 may record one or more videos, take one or more images, inform a user (e.g., a video producer) of the existence or location of the located group, stream or broadcast an image or video of the group, mark the location for future reference, inform a camera operator or another person of the location, or other actions. While this example is set in a stadium, it is understood that drones may be used in any place with a large gathering of people that may be televised or broadcast, such as an outdoor music festival, mega church, concert hall, political gathering or demonstration, exhibition hall, corporate rally, racing track, parade, or the like.

Figure 2:
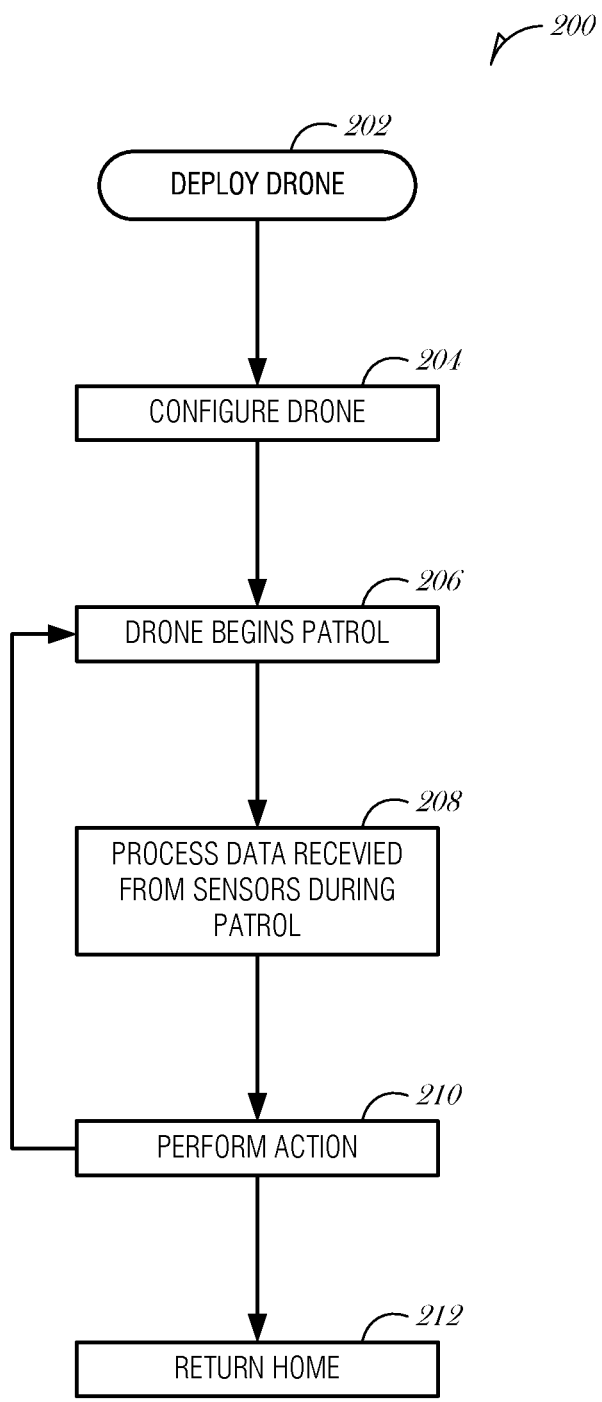
FIG. 2 is a flowchart illustrating control and data flow during operation, according to an embodiment.

FIG. 2 is a flowchart illustrating control and data flow 200 during operation, according to an embodiment. At operation 202, a drone is deployed. The drone is configured (operation 204) by a user. The configuration may be partially or completely performed before deployment (operation 202) or later while the drone is in operation. The configuration may provide various parameters to the drone, such as operational area, search parameters, and video parameters, for example. Search parameters may include various characteristics of people (e.g., gender, emotion, relationships, team affiliation).

The drone navigates to the designated area and begins its patrol (operation 206). The patrol may be over one or more predefined paths. Alternatively, the patrol may be random or arbitrary movement to cover an area. In some examples, the drone may be assigned a relatively stationery position with directives to monitor some or all of the visible area around the position. Combinations of a moving patrol and stationery patrol may be used. For example, the drone may be configured to move to a spot, search for people from the spot, and then move to another spot after a time interval.

The drone processes data received from the onboard sensors to find a possible match based on the search parameters (operation 208). The drone may process the data locally (onboard the drone) or remotely (e.g., using a cloud service). For example, the drone may capture an image and search the image for one or more people that may match the provided search filters. Alternatively, the drone may transmit the image to a processing service to perform the image analysis.

If the drone finds a possible match based on the search parameters, then the drone performs an action (operation 210). Actions may be configured before or during deployment. Example actions include recording video, streaming or broadcasting video, capturing an image, notifying a user of the possible match, or logging the location of the possible match. After performing the action (operation 210), the drone continues patrolling (operation 206). If the drone is completed with its deployment, the drone returns to the original location (operation 212) for maintenance, data offload, battery recharging, or the like.

Figure 3:
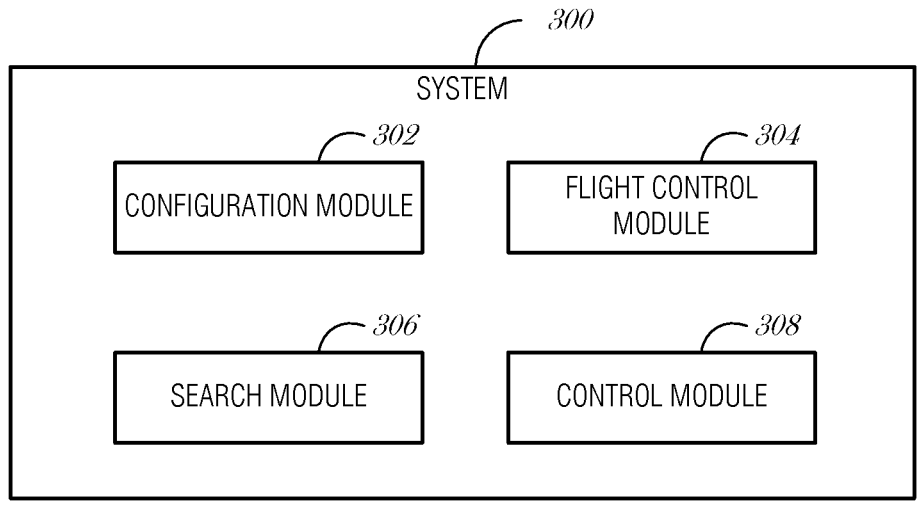
FIG. 3 is a block diagram illustrating an autonomous camera system for capturing media moments, according to an embodiment.

FIG. 3 is a block diagram illustrating an autonomous camera system 300 for capturing media moments, according to an embodiment. The autonomous camera system 300 includes a configuration module 302, a flight control module 304, a search module 306, and a control module 308. The configuration module 302 may be configured to receive configuration parameters. In an embodiment, the configuration parameters include search parameters that characterize the subject. In a further embodiment, the search parameters include a gender, an age, a relationship, or an emotion.

The flight control module 304 may be configured to autonomously maneuver the autonomous camera system over a crowd of people. In an embodiment, to maneuver the autonomous camera system, the flight control module is to maneuver the autonomous camera system according to a predefined route. In an embodiment, to maneuver the autonomous camera system, the flight control module is to maneuver the autonomous camera system arbitrarily by the autonomous camera system.

The search module 306 may be configured to search for a subject in the crowd of people based on the configuration parameters. In an embodiment, to search for the subject, the search module 306 is to access an image obtained by the autonomous camera system 300, and analyze the image to identify the subject. Image analysis may be performed at the autonomous camera system 300 or offloaded to a different computing device. Thus, in a further embodiment, to analyze the image, the search module 306 is to transmit image data of the image and parameterized data of the subject to a remote server, the remote server to analyze the image data to identify the subject and receive an indication of the subject from the remote server. The image data may be the image itself or other information about the image, such as a different representation of the image (e.g., a crop or zoom of the image, an alpha channel of the image, etc.). The parameterized data may be information about the subject based on the configuration parameters. For example, the parameterized data may indicate a relationship status of mother-daughter or a certain gender or age of the subject. Using the image data and the parameterized data, the remote server may analyze the image using various techniques.

In an embodiment, to analyze the image, the search module 306 is to access the configuration parameters to obtain a search parameter and search the image for an object that matches the search parameter. The object may be anything, such as a scoreboard, a goal, a person, a team, a coach, a portion of a playing field, a vehicle (e.g., a racecar), etc. Searching the image may be performed using edge detection, pattern matching, or other techniques.

In an embodiment, the search parameter indicates an emotion exhibited by the subject and to search the image for the object, the search module 306 is to search the image for a person exhibiting the emotion and identify the person as the subject. Emotions may be large-scale emotions (e.g., happy or sad) or more fine-scale, granular emotions (e.g., happy, enthusiastic, excited, etc.). In an embodiment, to search the image for the person exhibiting the emotion, the search module 306 is to analyze one of a facial expression or a body posture to determine whether a person in the image is exhibiting the emotion.

In an embodiment, the search parameter indicates a relationship between people, and to search the image for the object, the search module 306 is to search the image for a group of people having the relationship and identify the group of people as the subject. In an embodiment, to search the image for the group of people having the relationship, the search module 306 is to analyze physical characteristics of the group of people and recognize similarities among the physical characteristics of the group of people. For example, groups of fans may dress alike (e.g., similar colors that match their favorite team) or families may look alike. In an embodiment, the physical characteristics include height, hair color, clothing, skin color, or body morphology. Other characteristics may also be used individually or in combination with these physical characteristics.

In an embodiment, to search the image for the group of people having the relationship, the search module 306 is to identify a plurality of people from the group of people, access social profiles of the plurality of people, and determine that the plurality of people belong to a shared social group based on the social profiles. For example, using facial recognition, people in a group may be identified. A cross-reference search against popular social network sites may produce information about the groups that each of the people is affiliated with (e.g., work places, favorite teams, places of residence). If there are enough similarities, then the search module 306 may determine that the group of people, or some subset of the group of people, in the image have a relationship.

In an embodiment, to search for the subject, the search module 306 is to access audio data obtained by the autonomous camera system and analyze the audio data to identify the subject. The audio data may include utterances of one or more of the people in a group of people. The utterances may include keywords, such as "Dad" or "Mom" that indicate a relationship. The utterances may be used to determine whether the person is a fan of a particular team or player. For example, the configuration parameters may include a search parameter to find someone who is a fan of the Minnesota Vikings football team. By recognizing that a person is cheering by shouting "Go Vikes!" the search module 306 may determine that the person is a fan of the Vikings.

In an embodiment, to analyze the audio data, the search module 306 is to use natural language processing to identify a word or phrase and perform a lookup in a data dictionary for the word or phrase. In a further embodiment, the data dictionary is configured using the configuration parameters. Continuing the example from above, the configuration parameters may include search parameters of the word "Vikings" and the phrase "Let's Go Vikings." The search parameters may be stored in a dictionary and based on these dictionary entries, the phrase "Go Vikes!" is deemed sufficiently close to result in a match.

The control module 308 may be configured to perform an action when the subject is found in the crowd of people. In an embodiment, to perform the action, the control module 308 is to record video of the subject. In a further embodiment, the control module 308 is to transmit the video to a remote location. In a further embodiment, the remote location comprises a production studio. Other remote locations may be offsite data archival, cloud storage, broadcast booths, online viewer computers, or the like.

In an embodiment, to perform the action, the control module 308 is to notify a user of the location of the subject. The user may be a cameraman, producer, or director, for example. Using the location of the subject, other cameras may be trained on the subject for recording or broadcast.

In an embodiment, to perform the action, the control module is to log the location of the subject. The log may be used by other people, such as a cameraman to search for the subject at a later time. For example, at the beginning of the game the autonomous camera system 300 may be sent out to search for fans of a particular team who are related to one another. These families are identified, optionally confirmed by a user, and then logged for later reference. At halftime, the locations of these families may be referenced to capture them for a halftime show.

Figure 4:
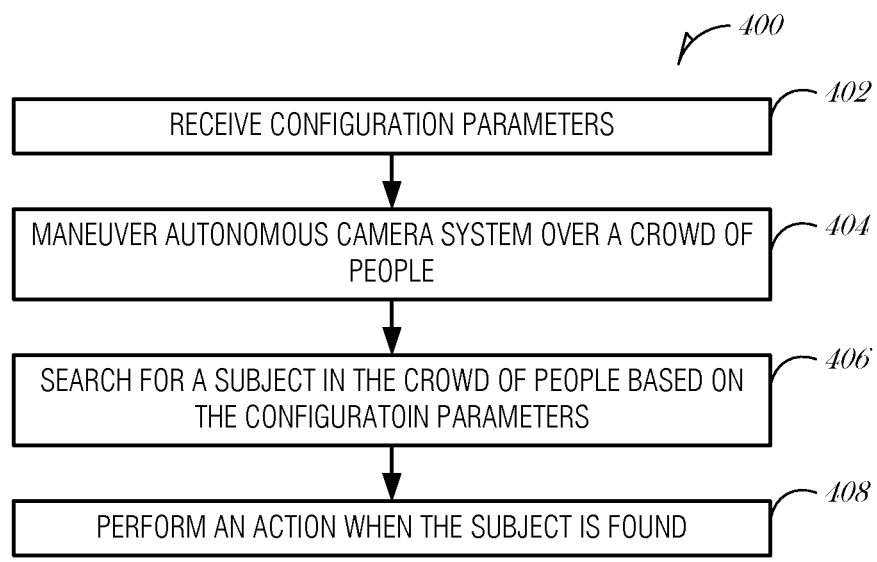
FIG. 4 is a flowchart illustrating a method of capturing media moments, according to an embodiment.

FIG. 4 is a flowchart illustrating a method 400 of capturing media moments, according to an embodiment. At block 402, configuration parameters are received at an autonomous camera system. In an embodiment, the configuration parameters include search parameters that characterize the subject. In a further embodiment, the search parameters include a gender, an age, a relationship, or an emotion.

At block 404, the autonomous camera system autonomously maneuvers over a crowd of people. In an embodiment, maneuvering the autonomous camera system is performed according to a predefined route. In an embodiment, maneuvering the autonomous camera system is performed arbitrarily by the autonomous camera system.

At block 406, the autonomous camera system searches for a subject in the crowd of people based on the configuration parameters. In an embodiment, searching for the subject comprises accessing an image obtained by the autonomous camera system and analyzing the image to identify the subject. In a further embodiment, analyzing the image comprises transmitting image data of the image and parameterized data of the subject to a remote server, the remote server to analyze the image data to identify the subject and receiving an indication of the subject from the remote server.

In an embodiment, analyzing the image comprises accessing the configuration parameters to obtain a search parameter and searching the image for an object that matches the search parameter. In a further embodiment, the search parameter indicates an emotion exhibited by the subject, and searching the image for the object comprises searching the image for a person exhibiting the emotion and identifying the person as the subject. In a further embodiment, searching the image for the person exhibiting the emotion comprises analyzing one of a facial expression or a body posture to determine whether a person in the image is exhibiting the emotion.

In an embodiment, the search parameter indicates a relationship between people, and searching the image for the object comprises searching the image for a group of people having the relationship and identifying the group of people as the subject. In a further embodiment, searching the image for the group of people having the relationship comprises analyzing physical characteristics of the group of people and recognizing similarities among the physical characteristics of the group of people. In a further embodiment, the physical characteristics include height, hair color, clothing, skin color, or body morphology.

In an embodiment, searching the image for the group of people having the relationship comprises identifying a plurality of people from the group of people, accessing social profiles of the plurality of people, and determining that the plurality of people belong to a shared social group based on the social profiles.

In an embodiment, searching for the subject comprises accessing audio data obtained by the autonomous camera system and analyzing the audio data to identify the subject. In a further embodiment, analyzing the audio data comprises using natural language processing to identify a word or phrase and performing a lookup in a data dictionary for the word or phrase. In a further embodiment, the data dictionary is configured using the configuration parameters.

At block 408, the autonomous camera system performs an action when the subject is found in the crowd of people. In an embodiment, performing the action comprises recording video of the subject. In a further embodiment, the method 400 includes transmitting the video to a remote location. In a further embodiment, the remote location comprises a production studio.

In an embodiment, performing the action comprises notifying a user of the location of the subject.

In an embodiment, performing the action comprises logging the location of the subject.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
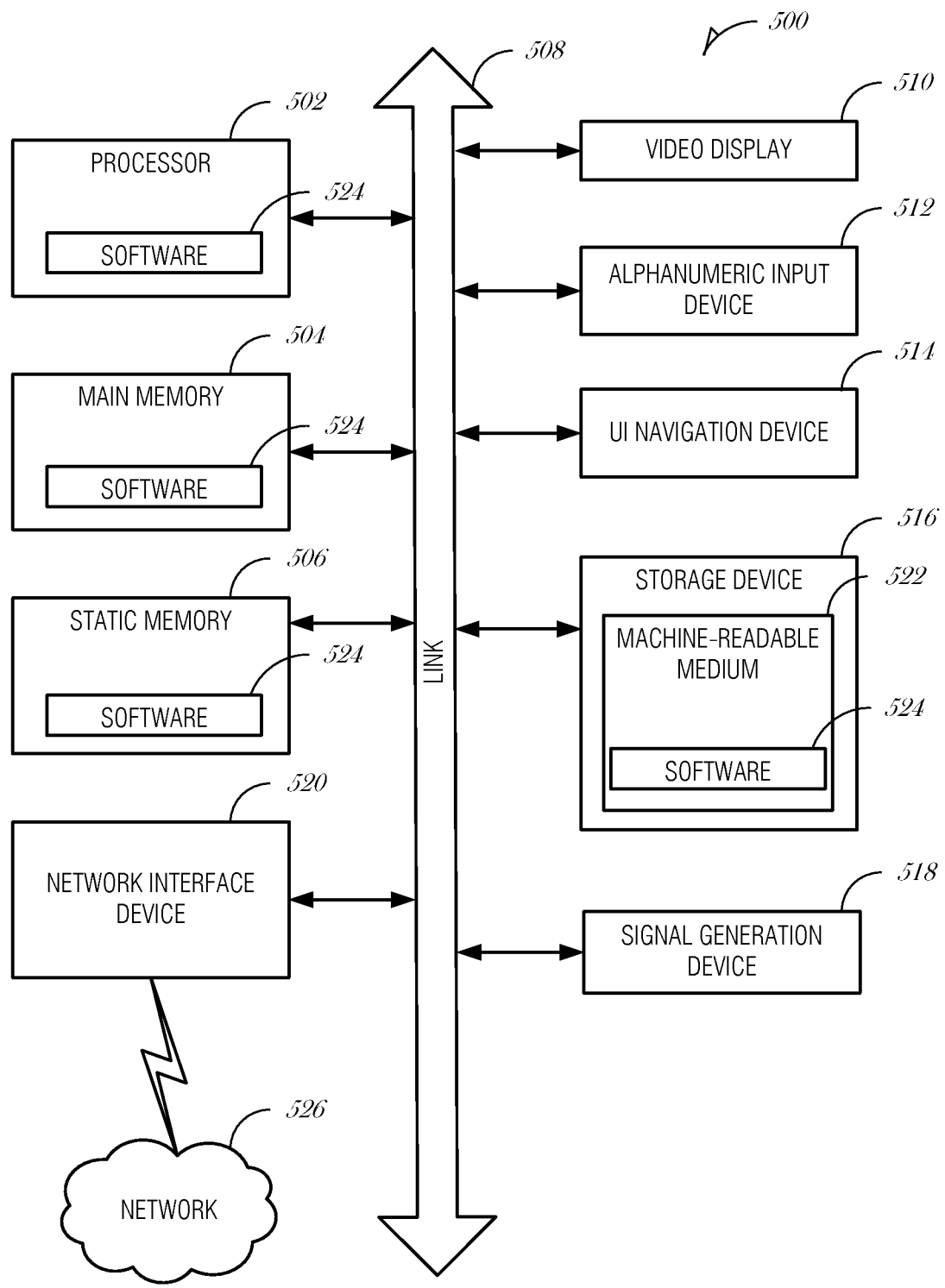
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for capturing media moments (such as a device, apparatus, or machine) comprising: a configuration module to receive configuration parameters; a flight control module to autonomously maneuver the autonomous camera system over a crowd of people; a search module to search for a subject in the crowd of people based on the configuration parameters; and a control module to perform an action when the subject is found in the crowd of people.

In Example 2, the subject matter of Example 1 may include, wherein the configuration parameters include search parameters that characterize the subject.

In Example 3, the subject matter of any one of Examples 1 to 2 may include, wherein the search parameters include a gender, an age, a relationship, or an emotion.

In Example 4, the subject matter of any one of Examples 1 to 3 may include, wherein to maneuver the autonomous camera system, the flight control module is to maneuver the autonomous camera system according to a predefined route.

In Example 5, the subject matter of any one of Examples 1 to 4 may include, wherein to maneuver the autonomous camera system, the flight control module is to maneuver the autonomous camera system arbitrarily by the autonomous camera system.

In Example 6, the subject matter of any one of Examples 1 to 5 may include, wherein to search for the subject, the search module is to: access an image obtained by the autonomous camera system; and analyze the image to identify the subject.

In Example 7, the subject matter of any one of Examples 1 to 6 may include, wherein to analyze the image, the search module is to: transmit image data of the image and parameterized data of the subject to a remote server, the remote server to analyze the image data to identify the subject; and receive an indication of the subject from the remote server.

In Example 8, the subject matter of any one of Examples 1 to 7 may include, wherein to analyze the image, the search module is to: access the configuration parameters to obtain a search parameter; and search the image for an object that matches the search parameter.

In Example 9, the subject matter of any one of Examples 1 to 8 may include, wherein the search parameter indicates an emotion exhibited by the subject; and wherein to search the image for the object, the search module is to: search the image for a person exhibiting the emotion; and identify the person as the subject.

In Example 10, the subject matter of any one of Examples 1 to 9 may include, wherein to search the image for the person exhibiting the emotion, the search module is to: analyze one of a facial expression or a body posture to determine whether a person in the image is exhibiting the emotion.

In Example 11, the subject matter of any one of Examples 1 to 10 may include, wherein the search parameter indicates a relationship between people, and wherein to search the image for the object, the search module is to: search the image for a group of people having the relationship; and identify the group of people as the subject.

In Example 12, the subject matter of any one of Examples 1 to 11 may include, wherein to search the image for the group of people having the relationship, the search module is to: analyze physical characteristics of the group of people; and recognize similarities among the physical characteristics of the group of people.

In Example 13, the subject matter of any one of Examples 1 to 12 may include, wherein the physical characteristics include height, hair color, clothing, skin color, or body morphology.

In Example 14, the subject matter of any one of Examples 1 to 13 may include, wherein to search the image for the group of people having the relationship, the search module is to: identify a plurality of people from the group of people; access social profiles of the plurality of people; and determine that the plurality of people belong to a shared social group based on the social profiles.

In Example 15, the subject matter of any one of Examples 1 to 14 may include, wherein to search for the subject, the search module is to: access audio data obtained by the autonomous camera system; and analyze the audio data to identify the subject.

In Example 16, the subject matter of any one of Examples 1 to 15 may include, wherein to analyze the audio data, the search module is to: use natural language processing to identify a word or phrase; and perform a lookup in a data dictionary for the word or phrase.

In Example 17, the subject matter of any one of Examples 1 to 16 may include, wherein the data dictionary is configured using the configuration parameters.

In Example 18, the subject matter of any one of Examples 1 to 17 may include, wherein to perform the action, the control module is to: record video of the subject.

In Example 19, the subject matter of any one of Examples 1 to 18 may include, wherein the control module is to: transmit the video to a remote location.

In Example 20, the subject matter of any one of Examples 1 to 19 may include, wherein the remote location comprises a production studio.

In Example 21, the subject matter of any one of Examples 1 to 20 may include, wherein to perform the action, the control module is to: notify a user of the location of the subject.

In Example 22, the subject matter of any one of Examples 1 to 21 may include, wherein to perform the action, the control module is to: log the location of the subject.

Example 23 includes subject matter for capturing media moments (such as a method, means for performing acts, machine readable medium including instructions that when performed by a machine cause the machine to performs acts, or an apparatus to perform) comprising: receiving configuration parameters at an autonomous camera system; autonomously maneuvering, by the autonomous camera system, over a crowd of people; searching, by the autonomous camera system, for a subject in the crowd of people based on the configuration parameters; and performing an action, by the autonomous camera system, when the subject is found in the crowd of people.

In Example 24, the subject matter of Example 23 may include, wherein the configuration parameters include search parameters that characterize the subject.

In Example 25, the subject matter of any one of Examples 23 to 24 may include, wherein the search parameters include a gender, an age, a relationship, or an emotion.

In Example 26, the subject matter of any one of Examples 23 to 25 may include, wherein maneuvering the autonomous camera system is performed according to a predefined route.

In Example 27, the subject matter of any one of Examples 23 to 26 may include, wherein maneuvering the autonomous camera system is performed arbitrarily by the autonomous camera system.

In Example 28, the subject matter of any one of Examples 23 to 27 may include, wherein searching for the subject comprises: accessing an image obtained by the autonomous camera system; and analyzing the image to identify the subject.

In Example 29, the subject matter of any one of Examples 23 to 28 may include, wherein analyzing the image comprises: transmitting image data of the image and parameterized data of the subject to a remote server, the remote server to analyze the image data to identify the subject; and receiving an indication of the subject from the remote server.

In Example 30, the subject matter of any one of Examples 23 to 29 may include, wherein analyzing the image comprises: accessing the configuration parameters to obtain a search parameter; and searching the image for an object that matches the search parameter.

In Example 31, the subject matter of any one of Examples 23 to 30 may include, wherein the search parameter indicates an emotion exhibited by the subject; and wherein searching the image for the object comprises: searching the image for a person exhibiting the emotion; and identifying the person as the subject.

In Example 32, the subject matter of any one of Examples 23 to 31 may include, wherein searching the image for the person exhibiting the emotion comprises: analyzing one of a facial expression or a body posture to determine whether a person in the image is exhibiting the emotion.

In Example 33, the subject matter of any one of Examples 23 to 32 may include, wherein the search parameter indicates a relationship between people, and wherein searching the image for the object comprises: searching the image for a group of people having the relationship; and identifying the group of people as the subject.

In Example 34, the subject matter of any one of Examples 23 to 33 may include, wherein searching the image for the group of people having the relationship comprises: analyzing physical characteristics of the group of people; and recognizing similarities among the physical characteristics of the group of people.

In Example 35, the subject matter of any one of Examples 23 to 34 may include, wherein the physical characteristics include height, hair color, clothing, skin color, or body morphology.

In Example 36, the subject matter of any one of Examples 23 to 35 may include, wherein searching the image for the group of people having the relationship comprises: identifying a plurality of people from the group of people; accessing social profiles of the plurality of people; and determining that the plurality of people belong to a shared social group based on the social profiles.

In Example 37, the subject matter of any one of Examples 23 to 36 may include, wherein searching for the subject comprises: accessing audio data obtained by the autonomous camera system; and analyzing the audio data to identify the subject.

In Example 38, the subject matter of any one of Examples 23 to 37 may include, wherein analyzing the audio data comprises: using natural language processing to identify a word or phrase; and performing a lookup in a data dictionary for the word or phrase.

In Example 39, the subject matter of any one of Examples 23 to 38 may include, wherein the data dictionary is configured using the configuration parameters.

In Example 40, the subject matter of any one of Examples 23 to 39 may include, wherein performing the action comprises: recording video of the subject.

In Example 41, the subject matter of any one of Examples 23 to 40 may include, transmitting the video to a remote location.

In Example 42, the subject matter of any one of Examples 23 to 41 may include, wherein the remote location comprises a production studio.

In Example 43, the subject matter of any one of Examples 23 to 42 may include, wherein performing the action comprises: notifying a user of the location of the subject.

In Example 44, the subject matter of any one of Examples 23 to 43 may include, wherein performing the action comprises: logging the location of the subject.

Example 45 includes at least one machine-readable medium including instructions, which when executed by a machine, cause the machine to perform operations of any of the Examples 23-44.

Example 46 includes an apparatus comprising means for performing any of the Examples 23-44.

Example 47 includes subject matter for capturing media moments (such as a device, apparatus, or machine) comprising: means for receiving configuration parameters at an autonomous camera system; means for autonomously maneuvering, by the autonomous camera system, over a crowd of people; means for searching, by the autonomous camera system, for a subject in the crowd of people based on the configuration parameters; and means for performing an action, by the autonomous camera system, when the subject is found in the crowd of people.

In Example 48, the subject matter of Example 47 may include, wherein the configuration parameters include search parameters that characterize the subject.

In Example 49, the subject matter of any one of Examples 47 to 48 may include, wherein the search parameters include a gender, an age, a relationship, or an emotion.

In Example 50, the subject matter of any one of Examples 47 to 49 may include, wherein the means for maneuvering the autonomous camera system is performed according to a predefined route.

In Example 51, the subject matter of any one of Examples 47 to 50 may include, wherein the means for maneuvering the autonomous camera system is performed arbitrarily by the autonomous camera system.

In Example 52, the subject matter of any one of Examples 47 to 51 may include, wherein the means for searching for the subject comprise: means for accessing an image obtained by the autonomous camera system; and means for analyzing the image to identify the subject.

In Example 53, the subject matter of any one of Examples 47 to 52 may include, wherein the means for analyzing the image comprise: means for transmitting image data of the image and parameterized data of the subject to a remote server, the remote server to analyze the image data to identify the subject; and means for receiving an indication of the subject from the remote server.

In Example 54, the subject matter of any one of Examples 47 to 53 may include, wherein the means for analyzing the image comprise: means for accessing the configuration parameters to obtain a search parameter; and means for searching the image for an object that matches the search parameter.

In Example 55, the subject matter of any one of Examples 47 to 54 may include, wherein the search parameter indicates an emotion exhibited by the subject; and wherein the searching the image for the object comprise: means for searching the image for a person exhibiting the emotion; and means for identifying the person as the subject.

In Example 56, the subject matter of any one of Examples 47 to 55 may include, wherein the searching the image for the person exhibiting the emotion comprise: means for analyzing one of a facial expression or a body posture to determine whether a person in the image is exhibiting the emotion.

In Example 57, the subject matter of any one of Examples 47 to 56 may include, wherein the search parameter indicates a relationship between people, and wherein the means for searching the image for the object comprise: means for searching the image for a group of people having the relationship; and means for identifying the group of people as the subject.

In Example 58, the subject matter of any one of Examples 47 to 57 may include, wherein the means for searching the image for the group of people having the relationship comprise: means for analyzing physical characteristics of the group of people; and means for recognizing similarities among the physical characteristics of the group of people.

In Example 59, the subject matter of any one of Examples 47 to 58 may include, wherein the physical characteristics include height, hair color, clothing, skin color, or body morphology.

In Example 60, the subject matter of any one of Examples 47 to 59 may include, wherein the means for searching the image for the group of people having the relationship comprise: means for identifying a plurality of people from the group of people; means for accessing social profiles of the plurality of people; and means for determining that the plurality of people belong to a shared social group based on the social profiles.

In Example 61, the subject matter of any one of Examples 47 to 60 may include, wherein the means for searching for the subject comprise: means for accessing audio data obtained by the autonomous camera system; and means for analyzing the audio data to identify the subject.

In Example 62, the subject matter of any one of Examples 47 to 61 may include, wherein the means for analyzing the audio data comprise: means for using natural language processing to identify a word or phrase; and means for performing a lookup in a data dictionary for the word or phrase.

In Example 63, the subject matter of any one of Examples 47 to 62 may include, wherein the data dictionary is configured using the configuration parameters.

In Example 64, the subject matter of any one of Examples 47 to 63 may include, wherein the means for performing the action comprise: means for recording video of the subject.

In Example 65, the subject matter of any one of Examples 47 to 64 may include, means for transmitting the video to a remote location.

In Example 66, the subject matter of any one of Examples 47 to 65 may include, wherein the remote location comprises a production studio.

In Example 67, the subject matter of any one of Examples 47 to 66 may include, wherein the means for performing the action comprise: means for notifying a user of the location of the subject.

In Example 68, the subject matter of any one of Examples 47 to 67 may include, wherein the means for performing the action comprise: means for logging the location of the subject.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An autonomous camera system for capturing media moments in a performance venue, the autonomous camera system comprising:
    a configuration circuitry to receive configuration parameters;
    a flight control circuitry to maneuver autonomously the autonomous camera system over a crowd of people in the performance venue, the maneuvering according to a patrol pattern;
    a search circuitry to search for a subject in the crowd of people based on the configuration parameters; and
    a control circuitry to perform an action when the subject is found in the crowd of people, wherein the action comprises notifying a cameraman or video producer of a location of the subject in the performance venue so that additional cameras may be focused on the subject.

2. The system of claim 1, wherein the configuration parameters include search parameters that characterize the subject.

3. The system of claim 2, wherein the search parameters include a gender, an age, a relationship, or an emotion.

4. The system of claim 1, wherein to maneuver the autonomous camera system, the flight control circuitry is to maneuver the autonomous camera system according to a predefined route.

5. The system of claim 1, wherein to search for the subject, the search circuitry is to:
    access an image obtained by the autonomous camera system; and
    analyze the image to identify the subject.

6. The system of claim 5, wherein to analyze the image, the search circuitry is to:
    access the configuration parameters to obtain a search parameter; and
    search the image for an object that matches the search parameter.

7. The system of claim 6, wherein the search parameter indicates an emotion exhibited by the subject; and wherein to search the image for the object, the search circuitry is to:
    search the image for a person exhibiting the emotion; and
    identify the person as the subject.

8. The system of claim 7, wherein to search the image for the person exhibiting the emotion, the search circuitry is to:
    analyze one of a facial expression or a body posture to determine whether a person in the image is exhibiting the emotion.

9. The system of claim 6, wherein the search parameter indicates a relationship between people, and wherein to search the image for the object, the search circuitry is to:
    search the image for a group of people having the relationship; and
    identify the group of people as the subject.

10. A method of capturing media moments in a performance venue, the method comprising:
    receiving configuration parameters at an autonomous camera system;
    autonomously maneuvering, by the autonomous camera system, over a crowd of people in the performance venue, the maneuvering according to a patrol pattern;
    searching, by the autonomous camera system, for a subject in the crowd of people based on the configuration parameters; and
    performing an action, by the autonomous camera system, when the subject is found in the crowd of people, wherein the action comprises notifying a cameraman or video producer of a location of the subject in the performance venue so that additional cameras may be focused on the subject.

11. The method of claim 10, wherein the configuration parameters include search parameters that characterize the subject.

12. The method of claim 10, wherein searching for the subject comprises:
    accessing an image obtained by the autonomous camera system; and
    analyzing the image to identify the subject.

13. The method of claim 12, wherein analyzing the image comprises:
    accessing the configuration parameters to obtain a search parameter; and
    searching the image for an object that matches the search parameter.

14. The method of claim 13, wherein the search parameter indicates a relationship between people, and wherein searching the image for the object comprises:
    searching the image for a group of people having the relationship; and
    identifying the group of people as the subject.

15. The method of claim 14, wherein searching the image for the group of people having the relationship comprises:
    analyzing physical characteristics of the group of people; and
    recognizing similarities among the physical characteristics of the group of people.

16. The method of claim 14, wherein searching the image for the group of people having the relationship comprises:
    identifying a plurality of people from the group of people;
    accessing social profiles of the plurality of people; and
    determining that the plurality of people belong to a shared social group based on the social profiles.

17. The method of claim 10, wherein searching for the subject comprises:
    accessing audio data obtained by the autonomous camera system; and
    analyzing the audio data to identify the subject.

18. The method of claim 17, wherein analyzing the audio data comprises:
    using natural language processing to identify a word or phrase; and
    performing a lookup in a data dictionary for the word or phrase.

19. At least one non-transitory machine-readable medium including instructions, which when executed by a machine, cause the machine to:
    receive configuration parameters at an autonomous camera system;
    autonomously maneuver, by the autonomous camera system, over a crowd of people in a performance venue, the maneuvering according to a patrol pattern;
    search, by the autonomous camera system, for a subject in the crowd of people based on the configuration parameters; and
    perform an action, by the autonomous camera system, when the subject is found in the crowd of people, wherein the action comprises notifying a cameraman or video producer of a location of the subject in the performance venue so that additional cameras may be focused on the subject.

20. The at least one non-transitory machine-readable medium of claim 19, wherein the configuration parameters include search parameters that characterize the subject.

21. The at least one non-transitory machine-readable medium of claim 19, wherein the instructions to search for the subject comprise instructions to:
   access an image obtained by the autonomous camera system; and
   analyze the image to identify the subject.

22. The at least one non-transitory machine-readable medium of claim 19, wherein the search parameter indicates a relationship between people, and wherein the instructions to search the image for the object comprise instructions to:
   search the image for a group of people having the relationship; and
   identify the group of people as the subject.

23. The at least one non-transitory machine-readable medium of claim 22, wherein the instructions to search the image for the group of people having the relationship comprise instructions to:
   analyze physical characteristics of the group of people; and
   recognize similarities among the physical characteristics of the group of people.

24. The at least one non-transitory machine-readable medium of claim 23, wherein the physical characteristics include height, hair color, clothing, skin color, or body morphology.

25. The at least one non-transitory machine-readable medium of claim 22, wherein the instructions to search the image for the group of people having the relationship comprise instructions to:
   identify a plurality of people from the group of people;
   access social profiles of the plurality of people; and
   determining that the plurality of people belong to a shared social group based on the social profiles.

* * * * *